United States Patent [19]

Kordomenos et al.

[11] Patent Number: 4,694,051

[45] Date of Patent: Sep. 15, 1987

[54] CHIP RESISTANT COATING COMPOSITION III

[75] Inventors: Panagiotis I. Kordomenos, Mt. Clemens; Andrew H. Dervan, Grosse Pointe Farms, both of Mich.

[73] Assignee: E. I. Du Pont de Nemours and Company, Wilmington, Del.

[21] Appl. No.: 943,764

[22] Filed: Dec. 19, 1986

[51] Int. Cl.$^4$ .................. C08G 18/06; C08G 16/36; C08G 71/04

[52] U.S. Cl. .................. 525/437; 525/440; 525/454; 525/903

[58] Field of Search .............. 525/437, 440, 454, 903

[56] References Cited

U.S. PATENT DOCUMENTS

| | | | |
|---|---|---|---|
| 2,890,208 | 6/1959 | Young et al. | 528/357 |
| 3,012,987 | 12/1961 | Ansul | 525/440 |
| 3,763,079 | 10/1973 | Fryd | 252/62.54 |
| 3,882,189 | 5/1975 | Hudak | 525/520 |
| 3,954,899 | 5/1976 | Chang et al. | 208/111 |
| 3,962,369 | 6/1976 | Chang et al. | 525/518 |
| 3,962,522 | 6/1976 | Chang et al. | 428/319.3 |
| 4,017,456 | 4/1977 | Tucker et al. | 524/91 |
| 4,034,017 | 7/1977 | Chang et al. | 49/233 |
| 4,134,873 | 1/1979 | Diaz et al. | 524/590 |
| 4,205,115 | 5/1980 | Piccirilli et al. | 428/334 |
| 4,208,495 | 6/1980 | Chang et al. | 525/440 |
| 4,235,977 | 11/1980 | Frisch et al. | 528/73 |
| 4,420,601 | 12/1983 | Kuroda et al. | 528/76 |
| 4,522,984 | 6/1985 | Watanabe et al. | 525/415 |
| 4,524,192 | 6/1985 | Alexander et al. | 525/440 |
| 4,533,703 | 8/1985 | Alexander et al. | 525/440 |
| 4,533,704 | 8/1985 | Alexander et al. | 525/440 |
| 4,554,332 | 11/1985 | Kordomenos et al. | 525/440 |
| 4,574,146 | 3/1986 | Kordomenos et al. | 525/530 |
| 4,581,424 | 4/1986 | Kordomenos et al. | 525/533 |

FOREIGN PATENT DOCUMENTS

| | | | |
|---|---|---|---|
| 1161594 | 1/1984 | Canada | 525/440 |
| 2840388 | 3/1980 | Fed. Rep. of Germany | 525/440 |

OTHER PUBLICATIONS

Advances in Interpenetrating Polymer Networks, K. C. Frisch and D. Klempner, Pure & Appl. Chem. vol. 53, pp. 1557–1566.

*Primary Examiner*—John C. Bleutge
*Assistant Examiner*—Robert E. L. Sellers
*Attorney, Agent, or Firm*—Hilmar L. Fricke

[57] ABSTRACT

This invention is directed to thermosetting coating compositions comprising hydroxy functional urethane modified polyester resin, blocked polyisocyanate crosslinking agent, diol modified blocked diisocyanate and polyamine having at least two amine groups selected from primary and secondary amine groups. The hydroxy functional urethane modified polyester resin is the product of polymerization of lactone monomers in the presence of hydroxy-containing urethane modified polyester precursor (i) having a number average molecular weight ($M_n$) between about 1,000 and about 10,000, (ii) having a hydroxy number between about 30 and about 300, and (iii) containing between about 1 and about 10 urethane groups per molecule.

21 Claims, No Drawings

CHIP RESISTANT COATING COMPOSITION III

TECHNICAL FIELD

This invention relates to a novel, solvent-based, thermosetting coating composition comprising hydroxy functional urethane modified polyester resin, blocked polyisocyanate crosslinking agent, diol modified blocked diisocyanate and polyamine having at least two amine groups selected from primary and secondary amine groups. It relates also to such coating composition formulated, for example, as a hot sprayable, high solids coating composition suitable for use as a chip resistant automotive vehicle primer adapted for use on body panel areas subject to chipping by stones, gravel and other road debris.

BACKGROUND

Automobile manufacturers, in their efforts to extend the expected life of automobile sheet metal and the like, have directed considerable attention to various processes and compositions designed to result in not only improved corrosion resistance but also improved chip resistance properties. In particular, research and development efforts have recently been directed to obtaining primer compositions which are flexible and chip resistant and which give corrosion protection while exhibiting good humidity and solvent resistance, as well as good intercoat adhesion. New automobile designs and concern about chipping in areas exposed to stones, gravel and other road debris, e.g. rocker panels, have demanded such chip resistant primers which can be applied in reasonable thicknesses by techniques which do not require extensive and expensive processing modifications during painting operations. To date available primers, whether high or low solids, have not proven suitable.

In order to overcome the aforementioned chipping problem it has been common to apply relatively thick chip resistant coatings in body panel regions which are inclined to chip, prior to application of still another primer composition. One such chip resistant sealer material which has been employed is a polyvinyl chloride plastisol sealer which has been applied with airless spraygun equipment in thicknesses of about 20 mils in regions subject to high levels of chipping. Problems attendant with such thick coatings are readily apparent. Because of the thickness in the region to which it is applied, these materials present an appearance problem often resulting in waviness and roughness in the final coating on the sheet metal. Often surface imperfections also result when a primer is applied over the top of this sealer, with the primer and sealer being cured together. Solvent and plasticizer tend to be driven out of the polyvinyl chloride plastisol sealer resulting in a wavy and rough surface. Still further problems associated with the use of such polyvinyl chloride plastisol sealers and the like involve application technique. Since the polyvinyl chloride plastisol sealers and the like must be applied in thicknesses of 20 mils or greater in order to obtain good adhesion, they cannot be feathered down to blend in the thickness with the coating over other regions of the sheet metal which do not require the additional chip protection. Thus, the materials must be applied using a masking technique, whereby those regions which are not to be coated with the sealer material are masked in a separate operation prior to application of sealer. This masking is then removed after the sealer is applied. It would obviously be desirable to eliminate these additional steps in the application of the chip resistant material.

Accordingly, it is a preferred object of this invention to provide a novel solvent based, thermosetting coating composition adapted for use as a chip resistant primer, which primer may be applied in thicknesses of less than 20 mils and which may be feathered in such a manner as to blend in thickness with paint covering other areas of the substrate which do not require a chip resistant coating.

It is another preferred object of this invention to provide a composition which will form a coating on a substrate, which coating has advantageous physical properties including, for example, humidity and solvent resistance, flexibility and corrosion protection for the underlying substrate. When the coating compositions of this invention are used with other coatings on a substrate, e.g., when used over a metal substrate or an electrocoated metal substrate and under a conventional spray primer and/or enamel topcoat, the flexibility of the coating composition of this invention results in improved adhesion and impact resistance of the total coating system.

It is still another object of the invention to provide coating compositions which provide tough, well cured films at minimum bake temperatures such as when applied as automotive primers. In this regard, it is a particular object of the invention to provide a novel thermosetting coating composition of sufficiently low Volatile Organic Content (VOC) to aid in meeting governmental emissions guidelines and yet which can be applied to a substrate by spraying or other known method.

DISCLOSURE OF THE INVENTION

According to the present invention, a novel, organic solvent based, thermosetting resin/crosslinking agent composition, in addition to solvent and any pigments and additives such as, for example, catalyst, flow control agents and the like, comprises hydroxy functional urethane modified polyester resin, blocked polyisocyanate crosslinking agent, diol modified blocked diisocyanate and polyamine having at least two, and preferably two, amine groups selected from primary and secondary amine groups.

The hydroxy functional urethane modified polyester resin of the invention composition preferably has a number average molecular weight ($\overline{Mn}$) of about 2,000 to about 20,000, more preferably between about 2,000 and about 6,000, and is the product of polymerization of lactone monomers in the presence of hydroxy-containing urethane modified polyester precursor (i) having a number average molecular weight ($\overline{Mn}$) between about 1,000 and about 10,000, (ii) having a hydroxy number between about 30 and about 300, and (iii) containing between about 1 and about 10 urethane groups per molecule. The polymerization of the lactone monomers is preferably carried out at a temperature between about 50° C. and about 300° C., more preferably at a temperature of between about 130° C. and about 200° C. The polymerization reaction mixture comprises between about 10 and about 80 weight percent hydroxy-containing urethane modified polyester precursor and between about 90 and about 20 weight percent lactone monomers. Preferably, the polymerization reaction mixture comprises between about 35 and about 65 weight percent hydroxy-containing urethane modified precursors and between about 65 and about 35 weight percent lactone monomers.

A first preferred type of such hydroxy-containing urethane modified polyester precursor suitable for forming the hydroxy functional urethane modified polyester resin of the invention composition is the reaction product of:

(A) urethane modified diol being the reaction product of:

(a) diol and (b) diisocyanate, wherein the diol and diisocyanate are reacted in a molar ratio of from about 4:1 to about 4:3, respectively;

(B) polyol comprising at least about 5 weight percent triol; and (C) acid component selected from dicarboxylic acids and anhydrides thereof.

Preferably, this first preferred type of such precursor has a hydroxyl number between about 30 and about 200.

A second preferred type of such hydroxyl-containing urethane modified polyester precursor suitable for forming the hydroxy functional resin of the invention composition is the reaction product of:

(A) hydroxy functional polyester resin being the reaction product of: (a) polyhydroxy material comprising diols and triols and (b) acid component selected from dicarboxylic acids and anhydrides thereof, wherein (a) and (b) are reacted in amounts so as to provide hydroxyl groups and carboxyl groups in a ratio of from about 6:2 to about 6:5, respectively; and (B) diisocyanate, wherein (A) and (B) are reacted in amounts which provide hydroxyl groups and isocyanate groups in a ratio of from about 4:1 to about 10:1, respectively.

Preferably, this second preferred type of such precursor has a hydroxyl number between about 50 and about 250 and contains between about 1 and about 7 urethane groups per molecule. Preferably, the polyhydroxy material comprises diols and triols in a hydroxyl equivalent ratio of from about 4:1 to about 1:4, more preferably this ratio is about 3:1 to about 3:2.5, respectively.

The blocked polyisocyanate crosslinking agent is preferably selected from the group consisting of, but not necessarily limited to, blocked trifunctional isocyanate ring containing polyisocyanates and oligoester modified blocked polyisocyanates.

The diol modified blocked diisocyanate is the reaction product of:

(i) diol having a number average molecular weight between about 200 and about 2,000;

(ii) diisocyanate; and (iii) active hydrogen bearing blocking agent for the diisocyanate; wherein the diol, the diisocyanate and the active hydrogen bearing blocking agent are employed in a molar ratio of about 1:2:2, respectively.

Preferably, the diol employed in forming the diol modified blocked diisocyanate is an aliphatic, polyether diol.

The polyamine contains at least two amine groups selected from primary and secondary amine groups and is essentially non-volatile at the temperature at which the diol modified blocked diisocyanate unblocks. The diol modified blocked diisocyanate and the polyamine are included in the composition of this invention in (i) a molar ratio of about 0.9:1.1 to about 1.1:0.9, respectively and (ii) a combined amount of between 10 and about 70 weight percent based on the weight of the composition, preferably, in a combined amount of between about 20 and about 40 weight percent based on the combined weight of the polyester resin, crosslinking agent, diol modified blocked diisocyanate and polyamine of the composition.

Particularly preferred compositions of the invention are those formulated as high solids coating compositions having solids levels in the range of 65-80% solids and which are applied as chip resistant primers in those areas of automotive panels, such as rocker panels, which are exposed to high levels of chipping. Such compositions may be applied in thicknesses ranging from 1 to 25 mils wet to obtain final coatings in the range of 1 to 12 mils dry, and may be feathered down to blend in thickness with paint applied to regions outside that requiring additional chip resistance protection. Generally, the compositions of this solids level may be applied using hot spray equipment at temperatures in the range of room temperature, i.e., about 70° F. to about 160° F.

Other preferred compositions of the invention are those formulated as high solids coating compositions adapted to be applied by conventional spraying onto a substrate. These high solids coating compositions may have a solids level in the range of 50-60% and are especially useful as a primer coating on the electrocoated, unpolished metal surface of an automotive vehicle. As used herein, a high solids coating composition is one having a volatile organic content of about 479 g/l (4.0 lb./gal.) or less.

While not wishing to be bound by theory, it is believed that these advantageous physical properties result from the cured coating composition of this invention being an Interpenetrating Polymer Network IPN) An IPN is a unique type of polymer alloy consisting of two (or more) crosslinked polymers containing essentially no covalent bonds or grafts between them. These intimate mixtures of crosslinked polymers are held together by permanent entanglements, produced during crosslinking of the two or more polymer systems. Formation of IPN's is believed to be the only way of intimately combining crosslinked polymers with the resulting mixtures exhibiting, at most, only limited phase separation. IPN's can be prepared by the simultaneous technique wherein linear polymers, prepolymers or monomers are first blended in liquid form together with the respective crosslinking agents, after which the solvent vehicle (if any) is evaporated, and then the component polymers are cured simultaneously. The combination of various chemical types of polymer networks in different compositions, resulting frequently in controlled, different morphologies, has produced IPN's with synergistic behavior. For example, if one polymer is glassy and the other is elastomeric at room temperature, one obtains either a reinforced rubber or a high impact plastic depending upon which phase is continuous. Thus, synergestic properties may be obtained by IPN's such as enhanced tensile and impact strength and improved adhesion.

We believe that, during curing of the coating composition of this invention, the diol modified blocked diisocyanate first unblocks and reacts with the polyamine component forming high molecular weight polyureas, which will be linear if the polyamine is a diamine having secondary amine groups or crosslinked if the polyamine is a diamine having at least one primary amine group or if the polyamine contains three or more amine groups. Subsequently, at higher temperatures during curing, the blocked polyisocyanate crosslinking agent unblocks and reacts with the hydroxy functional urethane modified polyester resin. Applicants' composition has been found to offer improved chip resistance as compared to coating compositions comprising the crosslinked polyester resin but not the polyurea described above. As noted above, Applicants believe that the improved properties of Applicants' coating composition, particularly the improved flexibility of the coating, are a result of the IPN networking of the coating composition. However, while this theory has been advanced to explain the excellent durability of this coating composition, neither its validity nor its understanding is necessary for the practice of the invention.

Other features and advantages of this invention will become more apparent from the following, detailed description thereof including the preferred embodiments and best mode of carrying out this invention.

Each of the above major components of the compositions as well as other components and other aspects of the invention is described hereinafter.

DETAILED DESCRIPTION OF THE INVENTION

A. Hydroxy Functional Urethane Modified Polyester Resin

As described above, this copolymer is the product of polymerization of lactone monomer in the presence of hydroxy-containing urethane modified polyester precursor.

It is believed to be a significant characterizing aspect of the hydroxy functional urethane modified polyester resin of the invention composition that the polymerized lactone portion of this hydroxy functional resin gives the resin flexibility as well as toughness, two key properties when choosing a primer for use in areas susceptible to chipping. Still further, because the hydroxy functional urethane modified polyester resins of the invention composition are branched, they require a minimum amount of crosslinking in order to obtain a suitable network for good coating integrity.

Each of the reactants employed in the preparation of the hydroxy functional urethane modified polyester resin is described in greater detail below.

(i) Hydroxy-Containing Urethane Modified Polyester Precursor

The hydroxy-containing urethane modified polyester precursor employed to make the hydroxy functional urethane modified polyester resins of the invention composition (i) have a number average molecular weight ($\overline{M}_n$) between about 1,000 and about 10,000, (ii) have a hydroxyl number between about 30 and about 300, and (iii) contain between about 1 and about 10 urethane groups per molecule. Two preferred types of precursors suitable for use in forming the hydroxy functional resin are hereinafter described in detail. While two preferred types of precursors are disclosed herein, this disclosure is not meant to limit the precursor to these preferred types. Other hydroxy-containing urethane modified polyester precursor suitable for use in forming the hydroxy functional resin of the invention composition will be apparent to those of the art in view of the present disclosure.

A first preferred type of precursor suitable for use in forming the hydroxy functional urethane modified polyester resin of this invention composition is the reaction product of:

(A) urethane modified diol being the reaction product of:

(a) diol and (b) diisocyanate, wherein the diol and the diisocyanate are reacted in a molar ratio of from about 4:1 to about 4:3, respectively;

(B) polyol comprising at least about 5 weight percent triol; and (C) acid component selected from dicarboxylic acids and anhydrides thereof.

In forming the urethane modified diol, the diol and diisocyanate are preferably reacted in a molar ratio of from about 2:0.8 to about 2:1.2, respectively, most preferably in a 2:1 molar ratio. This first type of precursor, which is the reaction product of urethane modified diol, polyol and acid component, preferably has a number average molecular weight ($\overline{M}_n$) between about 2,000 and about 4,000 and a hydroxyl number preferably between about 30 and about 200. Most preferably the hydroxyl number is between about 50 and about 120.

The diols employed in making the urethane modified diol include, but are not limited to, alkylene glycols, such as butylene glycol, neopentyl glycol, 1,5-pentene glycol, 3-cyclohexene-1,1-dimethynol, other glycols such as hydrogenated bisphenol A, caprolactone diol (e.g., the reaction product of caprolactone and ethylene glycol), hydroxy alkylated bisphenols, polyether glycols, e.g., poly(oxytetramethylene)glycol, and polyester diols, e.g., 2,2-dimethyl-3-hydroxy-propyl-2,2-dimethyl-3-hydroxypropionate, and the like. Preferred diols are neopentyl glycol and 2,2-dimethyl-3-hydroxypropyl-2,2-dimethyl-3-hydroxy-propionate, the latter material being commercially available as Esterdiol 204 (trademark, Union Carbide Corp., Danbury, Connecticut). While various types of diols have been mentioned above as suitable for use as the diol component in making the urethane modified diol, their disclosure is not meant to be limiting. Selection of other diols which would be suitable for use in forming the urethane modified diol would be well within the skill of those in the art in view of the present disclosure. Mixtures of diols may also be employed in making the urethane modified diol. Still further, in view of the principles discussed above for forming the urethane modified diol, one skilled in the art would appreciate that triols may be used in place of the diols to form urethane modified triols which may be employed herein.

The diisocyanate employed in making the urethane modified diol may be essentially any diisocyanate and numerous diisocyanates are well known in the art. The diisocyanate may be any of a number of aliphatic, cycloaliphatic, and aromatic diisocyanates, such as those selected from the group which includes, but which is not limited to, hydrocarbon diisocyanates and substituted hydrocarbon diisocyanates, such as 1,6-hexamethylene diisocyanate, isophorone diisocyanate, p-phenylene diisocyanate, biphenyl diisocyanate, toluene diisocyanate and 3,3-dimethyl-4,4-biphenylene diisocyanate. As would be apparent to those skilled in the art in view of the present disclosure, mixtures of various diisocyanates also may be employed as the diisocyanate component used in forming the urethane modified diol.

The polyol component, used in forming the first preferred hydroxy-containing urethane modified polyester precursor described above, comprises at least about 5 weight percent triol (based on the weight of the polyol component). Preferred triols are conventional low molecular weight triols such as 1,2,6-hexane triol, 1,1,1-trimethylol propane, 3-(2-hydroxy-propoxy)-1,2-propanediol and polycaprolactone triols, which are commercially available as, for example, TONE-301

(trademark, Union Carbide Corp., Danbury, Connecticut). This polyol component may also comprise, in addition to the triols, other polyol materials such as diols or tetrols. Preferably, however, these other polyols, when employed, consist of diols. Examples of suitable diols which may be included in the polyol component are those which have been disclosed above as suitable for forming the urethane modified diol. Preferred diols for use in the polyol component are linear aliphatic diols. While the polyol component may comprise materials such as diols in addition to the triols the polyol component may consist essentially of triols. By employing diols in the polyol component in addition to the triols the flexibility of the coating composition is generally increased. Thus, selection of the polyol component to be used in forming the first preferred hydroxy-containing urethane modified polyester precursor will be dependent on the particular desired properties and application of the coating composition. When diols are employed in the polyol component, the polyol preferably comprises from about 10 to about 80 weight percent triols and from about 90 to about 20 weight percent diols.

The acid component used to form the first preferred hydroxy-containing urethane modified polyester precursor is selected from the group comprising aliphatic, aromatic, and cycloaliphatic dicarboxylic acids and anhydrides thereof. Numerous examples of such dicarboxylic acids and anhydrides are well known to those in the art. Preferably the acid component is selected from the group comprising $C_6$-$C_{40}$ dicarboxylic acids and anhydrides thereof, which group includes, but is not limited to, adipic acid, azelaic acid, sebasic acid, dodecane dicarboxylic acid, dimer acid and cyclohexane dicarboxylic acid and anhydrides thereof. Mixtures of suitable acids and/or their anhydrides may also be used as the acid component in forming this precursor.

In forming the first preferred type of hydroxy-containing urethane modified polyester precursor, the diol (a) and the diisocyanate (b) are combined and reacted, generally at an elevated temperature, so as to form the urethane modified diol. The ratio of the diol to diisocyanate (i.e., a molar excess of diol) is such that at the completion of this reaction substantially no unreacted isocyanate groups are present. This urethane modified diol is then combined and reacted with the polyol and acid component, generally in the presence of a catalyst and at elevated temperatures, so as to effect formation of the hydroxy-containing urethane modified polyester precursor. Catalysts desirably assure a rapid and/or more complete carboxyl/hydroxyl condensation reaction. Exemplary of catalysts which may be so employed are dibutyl tin oxide, hydrated monobutyl tin oxide, butylchlorotin dihydroxide, butyl tin tris(2-ethylhexoate),tetraisopropyl titanate, strong acids such as p-toluene sulfonic acid, phosphoric acid, sulfuric acid, and materials such as zinc oxide, antimony oxide ($Sb_2O_3$) and sodium acetate. Still other catalysts useful for this purpose will be apparent to those skilled in the art in view of the present disclosure.

A second preferred type of precursor suitable for forming the hydroxy functional urethane modified polyester resins of this invention composition is the reaction product of:

(A) hydroxy functional polyester resin being the reaction product of: (a) polyhydroxy material comprising diols and triols with (b) acid component selected from dicarboxylic acids and anhydrides thereof, wherein (a) and (b) are reacted in amounts which provide hydroxyl groups and carboxyl groups in a ratio from about 6:2 to about 6:5, respectively; and (B) diisocyanate, wherein (A) and (B) are reacted in amounts which provide hydroxyl groups and isocyanate groups in a ratio of from about 4:1 to about 10:1, respectively.

Preferably, the polyhydroxy material comprises the diols and triols in a hydroxyl equivalent ratio from about 4:1 to about 1:4, respectively, more preferably from about 3:1 to about 3:2.5. By hydroxyl equivalent ratio is meant the ratio of the hydroxyl equivalents of the diol to the hydroxyl equivalents of the triol. This second preferred type of precursor, which is the reaction product of hydroxy functional polyester resin and diisocyanate, preferably has a number average molecular weight ($\overline{M}_n$) between about 2000 and about 4000 and a hydroxyl number preferably between about 50 and about 250, and preferably contains between about 1 and about 7 urethane groups per molecule.

The diols, triols, acid components and diisocyanates which are employed in forming this second preferred type of hydroxy-containing urethane modified polyester precursor may be selected from such reactants described above for making the first preferred type of hydroxy-containing urethane modified polyester precursor. For both the first and second type of precursor, suitable diols, triols, acid components and diisocyanates in addition to those expressly mentioned herein would be apparent to those of the art in view of the present disclosure.

In forming the second preferred type of precursor, the polyhydroxy material (i.e., diols, triols and optionally tetrols, etc.) and acid component are combined and reacted, generally at elevated temperatures and in the presence of a catalyst, so as to effect formation of a hydroxy functional polyester resin. Catalysts useful to accelerate the carboxyl/hydroxyl condensation reaction are well known in the art. Suitable carboxyl/hydroxyl catalysts have been previously disclosed herein. Others are known to those of the art. The hydroxy functional polyester resin is then modified by reaction with the diisocyanate, whereby urethane groups are incorporated into the polyester resin to form the second preferred type of hydroxy-containing urethane modified polyester precursor.

The reactions, whereby either the first or second preferred type of precursor is formed, are generally carried out in the presence of solvents commonly employed for coating formulations such as toluene xylene, methyl amyl ketone, etc.

Other suitable hydroxy-containing urethane modified polyester precursors are commercially available and known to those skilled in the art and would be apparent in view of this disclosure (ii) Lactone Monomers The lactone reactant may be any lactone, or combination of lactones, having at least six carbon atoms, for example, from six to eight carbon atoms, in the ring and at least one hydrogen substituent on the carbon atom which is attached to the oxy group in said ring. According to certain preferred embodiments, the lactone used as a reactant can be represented by the general formula:

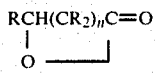

in which n is at least four, for example, from four to six, at least n+2 R's are hydrogen, and the remaining R's are substituents selected from the group consisting of hydrogen, alkyl, cycloalkyl, alkoxy and single ring aromatic hydrocarbon radicals. Lactones having greater numbers of substituents other than hydrogen on the ring, and lactones having five or less carbon atoms in the ring, are considered unsuitable for the purposes of the invention because of the tendency that polymers thereof have to revert to the monomer, particularly at elevated temperature.

The lactones preferred in this invention are the epsilon-caprolactones having the general formula

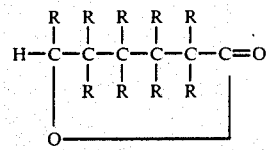

wherein at least six of the R's are hydrogen and the remainder are hydrogen, alkyl, cycloalkyl, alkoxy or single ring aromatic hydrocarbon radicals, none of the substituents contain more than about twelve carbon atoms, and the total number of carbon atoms in the substituents on a lactone ring does not exceed about twelve. Unsubstituted epsilon-caprolactone, in which all the R's are hydrogen, is derived from 6-hydroxyhexanoic acid and is most preferred. Substituted epsilon-caprolactones, and mixtures thereof, are available by reacting a corresponding substituted cyclohexanone with an oxidizing agent such as peracetic acid.

Among the substituted epsilon-caprolactones considered most suitable for the purposes of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not distributed; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enatholactone and eta-caprylolactone may also be polymerized in accordance with the invention.

Polymerization of the lactones in accordance with this invention is carried out in conventional manner in that the polymerization is initiated by reaction with a compound having at least one reactive hydrogen capable, with or without the aid of a catalyst, of opening the lactone ring and adding it as an open chain without forming water of condensation—in this case the initiator compound being the hydroxy-containing urethane modified polyester precursor described above.

The polymerization reaction mixture comprises between about 10 and about 80 weight percent of the above described hydroxy functional urethane modified polyester precursor and between about 10 and about 20 weight percent of the lactone monomers. Preferably, the polymerization reaction mixture comprises between about 35 and about 65 weight percent of the hydroxy functional urethane modified polyester precursor and between about 65 and about 35 weight percent of the lactone monomers.

To initiate and continue the polymerization of the lactone, the lactone and the initiator (i.e., the precursor) are preferably heated to a temperature between about 130° and 200° C. in order to achieve a practical and desirable rate of reaction with a minimum of decomposition. The temperature may be considerably lower however, i.e., as low as about 50° C. at the sacrifice of speed of reaction. It may also be considerably higher, i.e., up to about 300° C., although care must be taken at such higher temperatures because of the more likely losses, especially at temperatures above 250° C., due to decomposition or undesirable side reactions. Generally, therefore, a temperature range of 50° to 300° C. is considered operable and a more limited range between about 130° and 200° C. is considered preferable.

The polymerization may be, and preferably is, carried out with the use of a catalyst, such as a basic or neutral ester interchange catalyst, to accelerate the reaction. Among catalysts suitable for this purpose are such metals as lithium, sodium, potassium, rubidium, cesium, magnesium, calcium, barium, strontium, zinc, aluminum, titanium, cobalt, germanium, tin, lead, antimony, arsenic and cerium, as well as the alkoxides thereof. Additional suitable catalysts are, by way of example, the carbonates of alkali- and alkaline earth metals, zinc borate, lead borate, zinc oxide, lead silicate, lead arsenate, litharge, lead carbonate, antimony trioxide, germanium dioxide, cerium trioxide, cobaltous acetate and aluminum isopropoxide. Catalyst concentrations between about 0.001 and 0.5%, based on the weight of the starting lactones, are suitable. The preferred range is from 0.01 to 0.2%.

The hydroxy functional urethane modified polyester resin polymerization products obtained in accordance with the invention have number average molecular weights ($\overline{Mn}$) generally upwards of about 2,000, preferably within the range of about 2,000 to about 20,000, although number average molecular weights below and substantially above this range are obtainable if desired. Most preferably, the resin polymerization products have a number average molecular weight between about 2,000 and about 6,000. Also, while not wishing to be bound by theory, it presently is understood that the hydroxy functional urethane modified polyester resin has reactive terminal hydroxyl groups. Further, it presently is understood that it is characterized by the presence of series of interconnected, substantially linear units or groups composed of carbon, hydrogen and oxygen. The interconnected units are opened lactone residues each having a terminal oxy group at one end, a carbonyl group at the other end, an intermediate chain of at least five carbon atoms and at least one hydrogen substituent on the carbon atom in the intermediate chain that is attached to the terminal oxy group. The oxy group of one lactone residue is connected to the carbonyl group of an adjacent lactone residue in the series and the oxy group of the last lactone residue in a series is connected to a hydrogen to form a terminal hydroxyl group at one end of the series.

B. Blocked Polyisocyanate Crosslinking Agent

The crosslinking agent employed in the novel solvent based coating compositions of the invention comprises blocked polyisocyanate crosslinking agents. Exemplary of the types of blocked polyisocyanate crosslinking agents which may be employed in this invention are those disclosed in U.S. Pat. No. 4,476,259 issued Oct. 9, 1984 to Kordomenos, the disclosure of which is hereby expressly incorporated by reference for such teachings, in particular column 8, line 15 to column 12, line 63. The novel solvent based coating compositions of the invention, as a result of employing blocked polyisocyanate crosslinking agents, exhibit exceptional shelf stability even when corrosion inhibiting pigments such as zinc chromate are used in high concentrations.

As used herein "blocked polyisocyanate" means an isocyanate compound containing two or more isocyanate groups, substantially all of which have been reacted with a material which will prevent reaction of the isocyanate group at room temperature with compounds that conventionally react with such groups, and at least some of which will permit that reaction to occur at higher (cure) temperatures. In general the blocked polyisocyanate may be prepared by reacting a sufficient quantity of an active hydrogen containing blocking agent with the polyisocyanate to insure that no free isocyanate groups are present. The blocking agent may be represented by the formula BH and may be selected from numerous materials, hereinafter discussed, which bear an active hydrogen.

The proper proportion of blocked polyisocyanate crosslinking agent to polyester resin will depend, in part, upon the properties desired in the coating to be produced and, in part, upon the desired cure response of the coating composition (which will depend, in turn, upon the baking schedule to be used in curing the coating composition) and, in part, upon the desired storage stability of the composition, that is, upon the desired shelf life. Accordingly, the amounts of crosslinker that can be used with the epoxy ester resin varies considerably. Preferably the blocked polyisocyanate crosslinking agent is included in compositions of the invention in amounts sufficient upon unblocking of the blocked isocyanate groups at the cure temperature of the composition to provide between about 0.5 and about 1.6, preferably between about 0.8 and about 1.3, reactive isocyanate groups per hydroxyl group on the hydroxy functional urethane modified polyester resin of the coating composition as described above. Numerous types of blocked polyisocyanates are well known to those of the art which may be suitably used in this invention. Selection of such blocked polyisocyanates for use in this invention would be apparent to those of the art in view of the present disclosure. Particularly suitable blocked polyisocyanates, which will be discussed further hereinafter, include blocked polymethylene polyphenol isocyanates, isocyanurate ring containing blocked polyisocyanates and certain oligoester modified blocked polyisocyanates, all of which are described in detail in U.S. Pat. No. 4,476,259 to Kordomenos referenced above.

In the preparation of the blocked polyisocyanate crosslinking agent, any suitable organic polyisocyanate may be used. Representative examples are the aliphatic compounds, the cycloalkylene compounds, the aromatic compounds, substituted aromatic compounds, triisocyanates, tetraisocyanates, and polymerized polyisocyanates.

In addition, the organic polyisocyanate may be a prepolymer derived from a polyol including polyether polyol or polyester polyol, including polyethers which are reacted with excess polyisocyanates to form isocyanate-terminated prepolymers. The polyols may be simple polyols such as glycols, e.g., ethylene glycol and propylene glycol, as well as other polyols such as glycerol; trimethylolpropane, pentaerythritol, and the like, as well as mono-ethers such as diethylene glycol, tripropylene glycol and the like and polyethers, i.e., alkylene oxide condensates of the above.

A particular class of aromatic polyisocyanates which may be employed in the novel solvent based coating compositions of the invention are polymethylene polyphenol isocyanates having the formula:

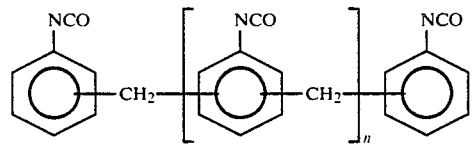

wherein n equals 1 to 3. Such compounds, sold under the tradename "PAPI" by the Upjohn Chemical Company of Kalamazoo, Michigan, have proven to be particularly useful in compositions of the invention, resulting in compositions exhibiting desirable toughness in the final cured coating.

The active hydrogen containing blocking agents which are reacted with the above described organic diisocyanates may be selected from numerous blocking agents which will be apparent to those skilled in this art. Representative of those blocking agents which are preferred are those selected from the group consisting of (i) aliphatic, cycloaliphatic and aromatic alkyl monoalcohols; (ii) phenols; (iii) hydroxyl amines; (iv) oximes; (v) lactams; (vi) triazoles; (vii) B-dicarbonyl compounds; (viii) hydroxamic acid esters; (ix) bisulfite addition compounds; and (x) esters of p-hydroxybenzoic acid and salicyclic acid. Perhaps the most widely used blocking agents at present are phenol, blanched alcohols, 2-butanone oxime (methylethyl ketoxime), and epsilon-caprolactam.

Catalysts plays an important role in the deblocking or thermal diisociation of the blocked isocyanates. Notably organo metallic compounds and tertiary amines are capable of lowering both the deblocking temperature and time as compared to the uncatalyzed system. In addition to tin compounds such as dibutyltin dilaurate and dibutyltin diacetate, various other metal compounds may be employed such as, e.g., zinc naphthenate, lead naphthenate, bismuth salts and titanates.

(i) Isocyanurate Ring Containing Blocked Isocyanate Compounds

In general, these blocked polyisocyanates maybe formed by blocking isocyanurate ring containing polyisocyanates with the aforementioned blocking agent. These compounds may be formed by cyclotrimerization of difunctional isocyanates. Usually, the reaction does not stop in this stage and continues through the formation of polyfunctional oligomers or a mixture of such oligomers with a portion of the pure trifunctional polyisocyanate. Mixtures of trifunctional product and various polyfunctional oligomers are commercially available.

A particular desirable blocked polyisocyanate crosslinking agent is the blocked form of the pure trifunctional isocyanurate represented by the following formula:

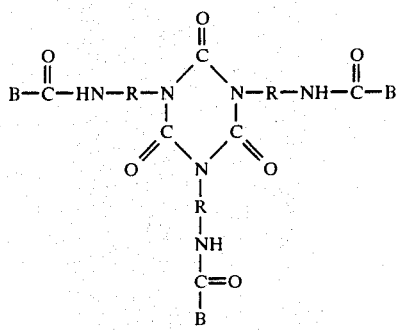

wherein R is selected from the group consisting of aliphatic, cycloaliphatic and aromatic groups and combinations thereof and B is the residue of an active hydrogen containing blocking agent. More specifically, this compound is disclosed in U.S. Pat. No. 4,491,633, the disclosure of which is incorporated herein by reference.

(ii) Oligoester Modified Blocked Polyisocanates

Still further, particular blocked polyisocyanates useful as crosslinking agents in the solvent based coating compositions of this invention are oligoester modified blocked polyisocyanates prepared from a particular class of oligoester diols and triols. A first type of such oligoester modified blocked polyisocyanates is prepared from organic diisocyanates bearing one isocyanate group more reactive than the other, with the more reactive isocyanate first being blocked with a blocking agent and the remaining isocyanate group then being reacted with hydroxyl functionality of an oligoester diol or triol as referred to above. The second type of oligoester modified blocked polyisocyanate may be prepared by reacting oligoester diols from the aforementioned class of oligoesters with an excess of organic diisocyanate so as to form an isocyanate terminated prepolymer followed by blocking of the terminal isocyanate groups of the prepolymer with an active hydrogen containing blocking agent. Each of these materials is particularly useful in the compositions of the invention and produces final cured coating compositions exhibiting outstanding flexibility.

Oligoesters of the type employed in the preparation of these crosslinking agents are described in U.S. Pat. No. 4,322,508 issued Mar. 30, 1982, the disclosure of which is hereby incorporated by reference. The hydroxy functional oligoesters within the useful class of materials (i) have a number average molecular weight ($\overline{Mn}$) between about 150 and about 3000, preferably between about 230 and about 1000, (ii) bear 2 or 3 hydroxyl groups per molecule, and (iii) are formed by an esterification reaction between a carboxylic acid and an epoxide.

C. Diol Modified Blocked Diisocyanate

The diol modified blocked diisocyanate of the composition of this invention is the reaction product of diol, diisocyanate and active hydrogen bearing blocking agent for the diisocyanate. The diol, diisocyanate and the active hydrogen blocking agent are reacted in a molar ratio of about 1:2:2, respectively.

The diol employed to make the diol modified blocked isocyanate is selected from those diols having a number average weight of between about 200 and about 2000, preferably a molecular weight of 600 to 1000. Numerous such diols are known to those skilled in the art and include, but are not limited to, those diols described above for making the urethane modified diol. Preferably, the diol employed to make the diol modified blocked diisocyanate is a polyether diol. Polyether diols have a lower viscosity than polyester diols of the same molecular weight, which is advantageous from a processing standpoint. Additionally, while polyether diols are generally not as stable as polyester diols, the polyether diols form more flexible coatings and thus, for both reasons, are preferably employed in forming chip resistant coatings of this invention.

Polyether polyols are generally prepared either by the addition of alkylene oxides to glycols or diamines or by polymerization (ring opening) of tetrahydrofuran. Commercially polyether diols are prepared by the base-catalyzed addition of alkylene oxides such as propylene, ethylene, and butylene oxide to difunctional alcohols. Since for most applications, it is desirable to have hydropholic urethane compositions, propylene oxide is usually used alone or in combination with small amounts (generally less than 10%) of ethylene oxide. The alcohols used in the manufacture of polyether diols include glycols, e.g., propylene glycol. In addition to neutral polyether diols, there are certain nitrogen containing polyether diols that may be employed. The initiators are usually compounds containing amine nitrogen 2-methylpiperizene or alkyldiolkanolamines such as methyldiethanolamine are typical initiators for basic polyether diols. Due to the presence of the tertiary amino nitrogen in these polyester diols, the reactivity of the hydroxyl groups toward isocyanate groups is greatly enhanced.

The diisocyanate and the active hydrogen bearing blocking agent for the diisocyanate employed to form the diol modified blocked diisocyanate may be selected from such available materials. Numerous such materials are well known to those of the art and examples of such materials which may be employed have been described above in section B, under "Blocked Polyisocyanate Crosslinking Agent." As described above, it is desired that the diol modified blocked diiscyanate unblocks during curing before the blocked polyisocyanate. Therefore, when selecting the blocking agent for forming the diol modified blocked diisocyanate and the blocking agent for forming the blocked polyisocyanate crosslinking agent, the blocking agents must be chosen so that the blocking agent for the diol modified blocked diisocyanate unblocks at a temperature at least about 10° C. lower than the temperature at which the blocking agent for the blocked polyisocyanate crosslinking agent unblocks. As a corollary, the blocking agent for the polyisocyanate crosslinking agent unblocks at a temperature at least about 10° C. higher than the temperature at which the blocking agent for the diol modified blocked diisocyanate unblocks. Preferred blocking agents employed in forming the diol modified blocked diisocyanate are the malonic esters, and methylethyl ketoxime.

The diol modified blocked diisocyanate may be formed by two different reaction sequences. In one sequence for forming the diol modified blocked diisocyanate, a diisocyanate having two isocyanate groups of different chemical reactivity, i.e., wherein one group is more chemically reactive than the other, may be employed. In such a case, the diisocyanate and the blocking agent would first be reacted together, in about a 1:1 molar ratio, whereby the more chemically reactive isocyanate groups would be blocked forming a half-blocked diisocyanate. Subsequently, the diol and the half-blocked diisocyanate would be reacted with about a 1:2 molar ratio, respectively, whereby the hydroxyl group of the diol would react with the unblocked isocyanate group of the half-blocked diisocyanate, forming the diol modified blocked diisocyanate. Exemplary of diisocyanates having isocyanate groups of different reactivity is toluene diisocyanate. Alternately, if a diisocyanate having isocyanate groups of substantially similar reactivity is employed to form the diol modified blocked diisocyanate, the diol and diisocyanate would be reacted in about a 1:2 molar ratio, respectively, and the resulting isocyanate terminated diol product subsequently would be reacted in about 1:1 molar ratio with the blocking agent.

D. Polyamine Component

The polyamine of this invention may be any amine having at least two amine groups selected from primary and secondary amine groups and which is essentially non-volatile at the temperature at which the diol modified blocked diisocyanate unblocks. Thus, the polyamines of this invention may be diamines, triamines, etc., having, e.g., a primary and a secondary amine group or two secondary amine groups, preferably, however, the polyamine is a diamine and the amine groups are terminal amine groups (i.e., present at the ends of the diamine). Such polyamines may be selected from aromatic, aliphatic and cycloaliphatic polyamines. Exemplary of such polyamines are ethylene diamine, cyclohexamine-4,4'-(methylenebis-2-methyl)aminoethyl piperozine, (available as Laromin C260, trademark BASF Chemical Co.), polyoxypropylene diamine, polyoxypropylene diamine, polyoxypropylenetriamine (available as Jeffamine D230, 400 and 403, respectively, trademark, Texaco Chemical Co., Ballaire, TX). Other polyamines which may be employed in this invention include, but are not limited to 1,2-propyldiamine, 1,3 propyldiamine, M-methyl-1,3-propanediamine, 2,2-dimethyl-1,3-propanediamine, 1,6-hexanediamine, N-(2-aminoethyl)-1,2-ethanediamine, N-(2-aminoethyl)-1,3-propanediamine, 4,4'-methylene biscyclohexanamine, 4,4'-methylene Bis-(2-methyl cyclohexanamine), 4,4'-methylene Bis-benzenamine. Preferably, the polyamines of this invention have a molecular weight below about 600, more preferably between about 200-600. The polyamine component may comprise mixtures of various polyamines. Selection of suitable polyamines for use in this invention would be within the skill of one in the art in view of the present disclosure. The diol modified blocked diisocyanate and the polyamine component are included in the composition in a molar ratio of about 0.9:1.1 to about 1.1:0.9, respectively, more preferably in about a 1:1 molar ratio, respectively. Additionally, the diol modified blocked diisocyanate and the diamine component are included in the composition in a combined amount of between about 10 and about 70 weight percent, preferably in an amount of between about 20 and about 40 weight percent based on the total weight of components (A), (B), (C) and (D) of the composition.

E. General Discussion—Other Aspects of Invention and Other Components

The coating compositions of the invention have been found to provide a cured coating having the advantageous physical properties described above, over a wide range of cure temperatures and a wide range of solids levels. More specifically, the coating compositions according to preferred embodiments of the invention have been found to cure at temperatures from as low as about 120° C. or less within about 15 minutes or less, and yet to cure and suffer no significant loss of advantageous physical properties at temperatures as high as about 200° C. or more for periods up to about 60 minutes or more. Considered together with the storage stability of the coating composition, it can be readily recognized that the present invention provides a highly significant advance in the coating composition art.

It will be within the skill of the art to determine the proper Volatile Organic Content (VOC) for a given coating composition of the invention and for a given application. Preferred solvents have relatively low volatility at temperatures appreciably below their boiling points such that solvent evaporation is low during storage and/or application of the coating composition to the substrate. A suitable solvent system may include, for example, toluene, methyl amyl ketone, isobutyl acetate, xylene, cellosolve acetate, acetone and a mixture of any of them. Other solvents which may be employed include terpenes, aliphatic and aromatic naphthas, and the like. Additional suitable solvents are commercially available and will be apparent to the skilled of the art in view of the present disclosure.

Any solvent allowed to remain in the cured coating should be inert so as to avoid adverse effect upon the cured coating or upon another coating layer used in conjunction with it during the curing process or thereafter. Preferrably, the cured coating is substantially free of solvent.

Sufficient solvent is used to reduce the viscosity of the coating composition to a level suitable for application to the substrate in the desired manner.

Obviously, in those cases where the composition is to be applied as a chip resistant primer the amount of solvent will be reduced so as to give a solids level of about 65-80%. Such higher solids materials are generally applied using hot spray equipment.

Flow control agent(s), for example, polybutyl acrylate; wetting agent(s), for example, silicone; pigments; pigment dispersants; corrosion inhibitors, for example, chromate pigments, numerous of all of which are known to the skilled of the art, may be employed in the coating compositions of the invention. In addition, suitable reactive additives can be used, including, for example, low molecular weight diol flow control agents and reactive diluents.

Compositions of the invention, and in particular the chip resistant primers of the invention, may also include anti-settling or anti-sagging agents to control the thixotropic properties of the composition. Exemplary of available materials suitable for this purpose are Zeothix (trademark) 265 manufactured by Huber Chemical, Havredehace, Maryland; Bentone (trademark) 38, N. L. Industries, Highstown, N.J. 08520; and Cab-0-Sil (trademark) M-5, Cabot Corporation, Boston, Mass..

Curing the coating composition requires baking for sufficient time at sufficiently elevated temperature to react the crosslinking agent with the hydroxyl functionality of the hydroxy functional urethane modified polyester resins. The time and temperature required to cure the coating are interrelated and depend upon the particular hydroxy functional urethane modified polyester resin, crosslinking agent, solvent and other materials, if any, and the amount of each comprising the coating composition. The coating compositions according to preferred embodiments of the invention, as described above, have been found to provide the best coating results when cured at temperature at about 150° C. (300° F.) for 20 minutes. It is a highly significant advantage of the invention, however, that these same coating compositions can withstand, for example, temperature as high as about 200° C. (390° F.) for periods of time as long as about 60 minutes. Accordingly, great flexibility is provided in both designing and implementing a curing schedule for parts coated with the coating compositions of the invention. Thus, in the assembly of automotive vehicles, for example, vehicles unavoidably held in a curing oven for long periods of time during unplanned assembly line shut-downs are recovered with cured and unharmed coatings.

High solids coating compositions according to the present invention, comprising the novel crosslinkable hydroxy functional urethane modified polyester resins of the invention, especially the preferred resins described above and amine-aldehyde crosslinking agent, especially the preferred materials described above, have been found to afford cured coatings with improved corrosion resistance and chip resistance, thus representing a highly advantageous advance in the art.

A most preferred use of the coating composition of the invention is as a high solids hot sprayable chip resistant primer for use on an electrocoated substrate such as for an automotive vehicle body which is subject to chipping. Primer compositions typically are pigmented and any pigments commonly included in primer compositions for metal substrates and acrylic dispersion topcoats such as, for example, carbon black, iron oxide, lithopone, magnesium silicate, silica, barium sulfate, $TiO_2$, chrome yellow, calcium chromate, strontium chromate, zinc potassium chromate any the like may be used. The primer can be pigmented according to known methods including, for example, by grinding pigments in a portion of the curable resin and adding to the primer composition.

The pigment-to-binder ratio of the chip resistant primer may be from about 0.5:1 to about 2:1 by weight, respectively; it is preferred, however, to use a primer having a pigment-to-binder ratio of from about 0.7:1 to about 1.5:1 by weight, respectively.

In preferred embodiments of this invention pigments and thixotropic agents desirably are dispersed with epoxy ester resins which do not have an elastomeric component as does the hydroxy functional urethane modified polyester resin employed as the primary film forming resin of the compositions of this invention. It has been found that, in addition to being very effective dispersing agents for the preparation of pigment millbases and thioxtropic dispersions, non-elastomeric epoxies give the compositions toughness. One type of epoxy useful for this purpose comprises the reaction product of diepoxide, diphenol and/or dimer acid and a mixture of Soya fatty acid and propionic acid (See Example 6). Other epoxy ester resins useful for this purpose are those disclosed in U.S. patent application Ser. Nos. 448,886 filed June 14, 1982 (abandoned), 431,465 filed Sept. 30, 1982 (abandoned) and in U.S Pat. No. 4,491,641 all assigned to the assignee of this application. These resins comprise the simultaneous reaction product of diepoxide with (i) diphenol, dicarboxylic acid or a mixture of them in chain extension reaction and (ii) fatty acid in chain terminating esterification reaction. Still other suitable epoxy resins useful for dispersing pigment and thixotropic agents will be apparent to the skilled of the art in view of the present disclosure.

No special expedients are necessary in formulating the primer compositions of this invention. For example, they may be prepared simply by incorporating the resinous components in a suitable solvent system. Thus, for example, by suitable mixing or agitation, each resinous component may be dissolved in a solvent and the resulting solutions combined to form finished primer compositions.

The solvent system may be any suitable combination of organic solvents as described above. For a high solids, hot sprayable, automotive vehicle chip resistant primer, the solvent will comprise preferably about 20 to about 40 percent by weight of the total coating compositions, although of course, larger or smaller amounts may be utilized depending upon the solids content desired.

The primer is generally maintained at about 65 to about 80 percent solids content for hot spraying purposes with conventional thinners such as aromatic hydrocarbons, commercial petroleum cuts which are essentially aromatic, and the like, and sprayed onto the metal base or other substrate and cured. The primer may be applied in greater thickness of 1 to 25 mils wet, preferably 10 to 25 mils wet in order to obtain final coatings in the desired range of 5–11 mils dry in regions highly susceptible to chipping. The primer thickness can be feathered down to the thickness of paints in areas not receiving the chip resistant primer. The primer is cured at elevated temperatures by any convenient means such as baking ovens or banks of infra-red heat lamps. Curing temperatures are preferably from about 135° C. to about 165° C., although curing temperatures from about 100° C. to about 230° C. may be employed, if desired.

INDUSTRIAL APPLICATION

It will be apparent from the foregoing that this invention has industrial applicability as a coating composition, especially as a hot sprayable, high solids coating composition suitable for use as a chip resistant automotive vehicle primer adapted for use on body panel areas subject to chipping by stones, gravel and other road debris.

The invention will be further understood by referring to the following detailed examples. It should be understood that these specific examples are presented by way of illustration and not by way of limitation. Unless otherwise specified, all references to "parts" are intended to mean parts by weight.

The following resin examples (1–10) were prepared in a five liter round bottom blask equipped with a stirrer, reflux condenser, thermometer, and heating mantle. The flask was flushed with dry nitrogen to maintain an inert atmosphere.

EXAMPLE 1

Hydroxy-containing urethane modified precursor of the invention was made according to this example. In a suitable reactor were weighed 862 parts xylene, 1070 parts Esterdiol 204 (trademark, Union Carbide, diol), and 0.4 parts T-12 catalyst (trademark, M&T, Chemical Co., dibutyl tin dilaurate). The temperature of the mixture was brought up to the point where it began to reflux. After one and a half hours, it was cooled to 105° F. 690 parts Desmondur W (trademark, Mobay Chemical Co., diisocyanate) were added to the mixture over three hours. The mixture was maintained at 110° C. until no residual NCO was detected. 454 parts Tone 0301 (trademark, Union Carbide, polycaprolactone triol), 500 parts adipic acid, and 7 parts Fascat 4100 (trademark M&T Chemical Co., catalyst) were added to the mixture. The temperature of the mixture was brought up to 155° C. At reflux, 123 parts of water were collected, the heat was increased to raise the temperature to 200° C. 700 parts xylene were removed from the mixture, and the remaining was returned to the flask. The reaction was continued until solution acid number of 6 was reached. The mixture was cooled to 150° C. and 1350 parts methyl amyl ketone were added. The resulting resin had Y viscosity at 60.0% solids.

EXAMPLE 2

Hydroxy functional urethane modified polyester resin of this invention was made according to this example. In a suitable reactor were weighed 2600 parts of the resin made in Example 1. The temperature was raised to 155° C. and the mixture was refluxed for half an hour. 800 parts epsilon-caprolactone were added to the mixture, and the temperature was maintained at 155° C. for two hours. The mixture was then allowed to cool. The resulting resin had a $Z_2$ viscosity at 70.0% solids.

EXAMPLE 3

Hydroxy functional urethane modified polyester resin of this invention was made according to this example. In a suitable reactor were weighed 2000 parts of the resin made in Example 1. The temperature was raised to 155° C. and the mixture was refluxed for half an hour. 1250 parts epsilon-caprolactone and 1 part dibutyltin oxide were added to the mixture. The temperature of the mixture was maintained at 155° C. for two hours and then allowed to cool. The resulting resin had a $Z_3$ viscosity at 75% solids.

EXAMPLE 4

Diol modified blocked diisocyanate of the invention was made according to this example. In a suitable reactor were weighed 696 parts 2,4 toluene diisocyanate. 348 parts methylethyl ketoxime were added dropwise over an hour and a half, and the temperature of the mixture rose from 25° C. to 50° C. The mixture was maintained at 50° C. until an NCO equivalent of 261 was attained. 8 drops of T-12 catalyst (trademark, M&T Chemical Co., dibutyltin dilaurate) was added to the mixture, and then 1280 parts Teracol 650 (trademark, DuPont, polyether diol) were added over one hour. The temperature of the mixture was raised to 85° C. After two hours no residual NCO was detected, and 580 parts M-pyrol were added to the mixture. The mixture was allowed to cool. The resulting resin had a $Z_5$ viscosity at 80.0% solids.

EXAMPLE 5

Diol modified blocked diisocyanate of the invention was made according to this example. In a suitable reactor were weighed 1078 parts 2,4 toluene diisocyanate. The temperature was brought up to 45° C.; 700 parts epsilon-caprolactam was added. The temperature slowly began to rise, and 600 parts Solvesso 150 was added to the mixture. The temperature was maintained at 50° C. until an NCO equivalent of 287 was attained. 624 parts Tone 0301 (trademark, Union Carbide, polycaprolactone diol) was added to the mixture and the temperature was raised to 105°-110° C. After four hours no residual NCO was detected via titration. 172 parts Solvesso 150 and 829 parts M-pyrol were added to the mixture which was then allowed to cool. The resulting resin had a $Z_5$ viscosity at 60.0% solids.

EXAMPLE 6

A dispersing agent was made according to this example. In a suitable reactor were weighed 1380 parts Epon 829 (trademark, Shell Chemical Co., diepoxide), 954 parts Empol 1016 (trademark, Emery Industries, dimer acid), 364 parts Soya fatty acid, 268 parts 2,2-bis(hydroxymethyl) propionic acid, and 13 parts lithium neodeconoate. The temperature of the mixture was brought up to about 175° C., at which point an exothermic reaction took place that raised the temperature to about 200° C. After one hour, the acid number was found to be less than 2. 940 parts Solvesso 100 and 305 parts Solvesso 150 were added and the mixture was cooled. The resin had a viscosity of $Z_7$ at 70.0% solids.

EXAMPLE 7

Blocked polyisocyanate crosslinking agent of the invention was made according to this example. In a suitable reactor were weighed 870 parts methylethyl ketoxime and 180 parts Solvesso 100. 1330 parts of PAPI 27 (trademark, UpJohn Chemical Co., isocyanate) was added dropwise to the mixture over two hours; the reaction temperature rose from room temperature to 85°-95° C. 39 parts 2-ethylhexanol was added to the mixture and the temperature of the mixture was maintained at 85°-95° C. for one hour. At that point, 816 parts of M-pyrol was added and the mixture was cooled. The resulting resin was dark brown and had a viscosity of 6000 cps at 68% solids.

EXAMPLE 8

Diol modified blocked diisocyanate of this invention was made according to this example. In a suitable reactor were charged 696 parts toluene diisocyanate and 100 parts Solvesso 100. 348 parts methylethyl ketoxime were added dropwise over 3 hours and the temperature of the mixture was allowed to rise to 50° C. The mixture was maintained at 50° C. until an NCO equivalent of 261 was attained. 6 drops of T-12 catalyst (trademark, M&T Chemical Co.) were added to the mixture, and then 873 parts Pluracol P-410 (trademark, BASF Chemical, polyether diol) were added over 1 hour. Temperature of the mixture was raised to 90° C. After two hours no residual NCO was detected, and 325 parts M-pyrol were added to the mixture, and it was allowed to cool. The resulting resin had a $Z_7$ viscosity at 80.0% solids.

EXAMPLE 9

Diol modified blocked diisocyanate of this invention was made according to this example. In a suitable reactor were charged 522 parts toluene diisocyanate and 100 parts Solvesso 100. 261 parts methylethyl ketoxime were added dropwise over 3 hours and the temperature was allowed to rise to 50° C. The mixture was maintained at 50° C. until an NCO equivalent of 261 was attained. 6 drops of T-12 catalyst (trademark, M&T Chemical Co.,) was added to the mixture, and then 1161 parts Pluracol P-710 (trademark, BASF Chemicals, polyether diol) were added over 1 hour The temperature of the mixture was raised to 90° C. After 2 hours no residual NCO was detected, and 386 parts M-pyrol were added to the mixture and it was allowed to cool. The resulting resin had a $Z_4$ viscosity at 80.0% solids.

EXAMPLE 10

Diol modified a blocked diisocyanate of this invention was made according to this example. In a suitable reactor were charged 696 parts toluene diisocyanate and 150 parts Solvesso 100. 348 parts methylethyl ketoxime and 150 parts Solvesso 100 were added dropwise over 3 hours and the temperature was allowed to rise to 50° C. The mixture was maintained at 50° C. until an NCO of 261 was attained. 6 drops of T-12 catalyst (trademark, M&T Chemical Co.,) was added to the mixture, and the 1060 parts Tone 0200 (trademark, Union Carbide, polycaprolactone diol) was added over 1 hour. The temperature of the mixture was raised to 90° C. After 52 hours no residual NCO was detected, and 376 parts M-pyrol were added to the mixture, and it was allowed to cool. The resulting resin had $Z_6$ viscosity at 80.0% solids.

EXAMPLE 11

Bentone Gel Preparation To a clean Ball Mill, were charged the following:

|  | Parts |
|---|---|
| Solvesso 150 | 513 |
| Propylene Carbonate | 13 |
| Bentone 38 | 30 |
| The mixture was ground for 30 minutes, then was added: | |
| Resin of Example 6 | 384 |
| The mixture was further ground approximately 2 Hrs. to 8 Hegman | |
| Letdown with: | 60 |
| Solvesso 150 | |
| | 1000 |

EXAMPLE 12

Millbase

In a one gallon can or ball mill were charged the following materials and one quart of diagonal shot. The mixture was placed in a roller mill for 16–24 hours to reach 7+Hegman dispersion. At that point, the letdown was added, and the mixture was run an additional hour on the roller mill.

|  | A | B |
|---|---|---|
| Toluene | — | 100 |
| Xylene | — | 185 |
| Solvesso 100 | — | 300 |
| Solvesso 150 | 585 | — |
| 2-Ethyl Hexanol | 95 | 95 |
| Polyethylene Wax | 70 | 70 |
| Anti-Terra U* | 40 | 40 |
| Resin of Example 6 | 103 | 103 |
| Barytes | 2259 | 2259 |
| TiO$_2$ | 429 | 429 |
| Carbon Black | 29 | 29 |
| Strontium Chromate | 143 | 143 |
| Letdown: | | |
| Resin of Example 6 | 247 | 247 |

*Trademark of Byk Malline Krodt, Wallingford, CT. 06492, Anti-Terra U is an antisettling and wetting agent.

The coating composition of Examples 13–21 were prepared by sequential mixing using a variable speed cowles blade mixer in a quart can. The millbase, resin, crosslinker, thixotrope, and solvents were added in that sequence while mixing.

The compositions were warmed to 110°–120° F. in an oven and sprayed by siphon gun. High Build (1.5 mils) electrocoated panels were sprayed and baked at 155° C. for 20 minutes. The thickness of the coating varied from 3 mils to 8 mils. The panels were then top-coated with white enamel and tested for chip resistance using 10 pts. of gravel in SAE gravelometer test. All the compositions exhibited excellent chip resistance. In addition, panels were tested for corrosion resistance (500 hrs. salt spray test, scribed panels) and Cleveland humidity resistance with excellent results.

EXAMPLES 13–15

The following coating compositions of the invention were formulated as shown below.

| | Example | | |
|---|---|---|---|
| Composition | 13 | 14 Parts | 15 |
| Millbase of Example 12A | 295 | 295 | — |
| Millbase of Example 12B | — | — | 300 |
| Resin of Example 2 | 160 | 207 | — |
| Resin of Example 3 | — | — | 92 |
| Resin of Example 5 | 160 | 213 | 103 |
| Resin of Example 6 | — | 33 | 31 |
| Resin of Example 4 | 180 | 88 | — |
| Resin of Example 8 | — | — | 260 |
| Resin of Example 11 | 133 | 133 | — |
| Laromin C260[1] | 32 | 16 | 48 |
| Zeothix 265[2] | — | — | 25 |
| M-pyrol | 40 | 25 | 100 |
| Xylene | — | — | 85 |

[1]Trademark, BASF Chemical, Holland, Mi., cycloaliphatic diamine
[2]Trademark, Huber Chemical, Havre de Grace, Maryland, precipated silica.

EXAMPLES 16–21

The following coating compositions of the invention were formulated as shown below.

| | Example | | | | | |
|---|---|---|---|---|---|---|
| Composition | 16 | 17 | 18 Parts | 19 | 20 | 21 |
| Millbase of Example 12B | 300 | 300 | 300 | 300 | 300 | 300 |
| Resin of Example 3 | 151 | 151 | 151 | 151 | 151 | 151 |
| Resin of Example 5 | 167 | 167 | 167 | 167 | 167 | 167 |
| Resin of Example 6 | 51 | 51 | 51 | 51 | 51 | 51 |
| Resin of Example 4 | — | — | 180 | — | — | — |
| Resin of Example 8 | 174 | — | — | — | — | 180 |
| Resin of Example 9 | — | 192 | — | — | — | — |
| Resin of Example 10 | — | — | — | 190 | 170 | — |
| Jeffamine D230[1] | 33 | — | 28 | — | — | — |
| Amino ethyl piperazine | — | 18 | — | 19 | — | — |
| Laromin C260[2] | — | — | — | — | 35 | 32 |
| Zeothix 265[3] | 25 | 25 | 25 | 25 | 25 | 25 |
| M-pyrol | 90 | 87 | 89 | 88 | 92 | 85 |
| Solvesso 150 | 9 | 9 | 9 | 9 | 9 | 9 |
| | 1000 | 1000 | 1000 | 1000 | 1000 | 1000 |

[1]Trademark, Texaco Chemical, Ballaire, TX., polyoxypropyleneamine.
[2]Trademark, BASF Chemical, aliphatic diamine.
[3]Trademark, Huber Chemical, Havre de Grace, MD., precipated silica.

EXAMPLES 22–24

The following coating compositions of the invention are formulated as shown below.

| | Example | | |
|---|---|---|---|
| Composition | 22 | 23 Parts | 24 |
| Millbase of Example 12B | 300 | 300 | 300 |
| Resin of Example 3 | 151 | 151 | 151 |
| Resin of Example 5 | 167 | 167 | 167 |
| Resin of Example 6 | 51 | 51 | 51 |

-continued

| Composition | Example | | |
|---|---|---|---|
| | 22 | 23 | 24 |
| | Parts | | |
| Resin of Example 4 | — | 172 | — |
| Resin of Example 8 | 175 | — | 208 |
| Laromin C260[1] | 16 | — | — |
| Zeothix 265[2] | 25 | 25 | 25 |
| M-pyrol | 90 | 89 | 79 |
| Jeffamine T-403 | — | 36 | — |
| Jeffamine D-230 | 16 | — | — |
| Ethylene diamine | — | — | 10 |
| Solvesso 150 | 9 | 9 | 9 |
| | 1000 | 1000 | 1000 |

[1]BASF Chemical Intermediates, Parsippony, N.J.
[1]Trademark, BASF Chemical, Holland, Mi., cycloaliphatic diamine
[2]Trademark, Huber Chemical, Havre de Grace, Maryland, precipated silica.

In view of the disclosure, many modifications of this invention will be apparent to those skilled in the art. It is intended that all such modifications which fall within the true scope of this invention be included within the terms of the appended claims.

We claim:

1. An organic solvent based, thermosetting coating composition comprising:
   A. hydroxy functional urethane modified polyester resin having a number average molecular weight ($\overline{M}_n$) between about 2,000 and about 20,000, said resin being the product of polymerization of lactone monomers in the presence of hydroxy-containing urethane modified polyester precursor (i) having a number average molecular weight ($\overline{M}_n$) between about 1,000 and about 10,000, (ii) having a hydroxyl number between about 30 and about 300, and (iii) containing between about 1 and about 10 urethane groups per molecule, wherein the polymerization reaction mixture comprises between about 10 and about 80 weight percent said hydroxy-containing urethane modified polyester precursor and between about 90 and about 20 weight percent said lactone monomers;
   B. blocked polyisocyanate crosslinking agent comprising at least two isocyanate groups which have been blocked by reaction with an active hydrogen bearing blocking agent, said blocked polyisocyanate crosslinking agent being included in said composition in an amount sufficient upon unblocking of the blocked isocyanate groups thereof to provide between about 0.5 and about 1.6 reactive isocyanate groups per hydroxyl group on said hydroxy functional urethane modified polyester resin;
   C. diol modified blocked diisocyanate being the reaction product of:
      (i) diol having a number average molecular weight between about 200 and about 2,000;
      (ii) diisocyanate; and
      (iii) active hydrogen bearing blocking agent for said diisocyanate;
   wherein said diol (i), said diisocyanate (ii) and said active hydrogen bearing blocking agent (iii) are employed in a molar ratio of about 1:2:2, respectively and wherein said diol modified blocked diisocyanate unblocks at a temperature at least 10° C. lower than the temperature at which said blocked polyisocyanate crosslinking agent unblocks; and
   D. polyamine having at least two amine groups selected from primary and secondary amine groups, said polyamine being essentially non-volatile at the temperature at which said diol modified blocked diisocyanate unblocks, wherein said diol modified blocked diisocyanate and said polyamine are included in said composition in (i) a molar ratio of from about 0.9:1.1 to about 1.1:0.9, respectively and (ii) a combined amount of between 10 and about 70 weight percent based on the total weight of components (A), (B), (C) and (D) of said composition.

2. A thermosetting coating composition according to claim 1, wherein said hydroxy-containing urethane modified polyester precursor is the reaction product of:
   (A) urethane modified diol being the reaction product of:
      (a) diol and (b) diisocyanate, wherein said diol and said diisocyanate are reacted in a molar ratio from about 4:1 to about 4:3, respectively;
   (B) polyol comprising at least about 5 weight percent triol; and
   (C) acid component selected from dicarboxylic acids and anhydrides thereof.

3. A thermosetting coating composition according to claim 2, wherein said precursor has a number average molecular weight between about 2,000 and about 4,000.

4. A thermosetting coating composition according to claim 2, wherein said precursor has a hydroxyl number between about 30 and about 200.

5. A thermosetting coating composition according to claim 2, wherein said polyol further comprises diol.

6. A thermosetting coating composition according to claim 2, wherein said acid component is selected from the group consisting of $C_6$–$C_{40}$ dicarboxylic acids and anhydrides thereof.

7. A thermoetting coating composition according to claim 1, wherein said hydroxy-containing urethane modified polyester precursor is the reaction product of:
   (A) hydroxy functional polyester resin being the reaction product of:
      (a) polyhydroxy material comprising diols and triols, and (b) acid component selected from dicarboxylic acid and anhydrides thereof, wherein said (a) and (b) are reacted in amounts which provide hydroxyl groups and carboxyl groups in a ratio of from about 6:2 to about 6:5, respectively; and
   (B) diisocyanate,
wherein said (A) and (B) are reacted in amounts which provide hydroxyl groups and isocyanate groups in a ratio of from about 4:1 to about 10:1, respectively.

8. A thermosetting coating composition according to claim 7, wherein said precursor has a number average molecular weight between about 2,000 and about 4,000.

9. A thermosetting coating composition according to claim 7, wherein said precursor has a hydroxyl number between about 50 and about 250.

10. A thermosetting coating composition according to claim 7, wherein said polyhydroxy material comprises linear aliphatic diols.

11. A thermosetting coating composition according to claim 7, wherein said acid component is selected from $C_6$–$C_{40}$ dicarboxylic acids and anhydrides thereof.

12. A thermosetting coating composition according to claim 1, wherein said diol has a number average molecular weight of between about 600 and about 1000.

13. A thermosetting coating composition according to claim 1, wherein said diol is selected from aliphatic, polyether diols.

14. A thermosetting coating composition according to claim 1, wherein said diisocyanate employed to make the diol modified blocked diisocyanate bears diisocyanate groups of substantially differing chemical reactivity.

15. A thermosetting coating composition according to claim 14, wherein said diol modified blocked diisocyanate is the reaction product of said diol with a partially blocked diisocyanate which is the reaction product of said diisocyanate (ii) with said active hydrogen bearing blocking agent (iii).

16. A thermosetting coating composition according to claim 1, wherein said active hydrogen bearing blocking agent for said diisocyanate (iii) is selected from the group consisting of methyl ethyl ketoxime and epsilon-caprolactam.

17. A thermosetting coating composition according to claim 1, wherein said polyamine is a diamine.

18. A thermosetting coating composition according to claim 17, wherein said amine groups are terminal amine groups.

19. A thermosetting coating composition according to claim 1, wherein said diol modified blocked diisocyanate and said polyamine are included in said composition in about a 1:1 molar ratio.

20. A thermosetting coating composition according to claim 1, wherein said diol modified blocked diisocyanate and said polyamine are included in said composition in a combined amount of between about 20 and about 40 weight percent based on the total weight of components (A), (B), (C) and (D) of the composition.

21. A thermosetting coating composition according to claim 1, wherein said blocked polyisocyanate crosslinking agent is included in said composition in an amount sufficient, upon unblocking of said isocyanate groups thereof, to provide between about 0.8 and about 1.3 reactive isocyanate groups per hydroxyl group on said hydroxy functional urethane modified polyester resin.

* * * * *